(12) United States Patent
Du et al.

(10) Patent No.: US 8,504,786 B2
(45) Date of Patent: Aug. 6, 2013

(54) METHOD AND APPARATUS FOR BACKING UP STORAGE SYSTEM DATA

(75) Inventors: Yumin Du, Shenzhen (CN); Xiaohua Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 600 days.

(21) Appl. No.: 12/424,280

(22) Filed: Apr. 15, 2009

(65) Prior Publication Data

US 2009/0282204 A1 Nov. 12, 2009

(30) Foreign Application Priority Data

May 8, 2008 (CN) .......................... 2008 1 0097024

(51) Int. Cl.
*G06F 13/00* (2006.01)
(52) U.S. Cl.
USPC .................... 711/162; 711/E12.103; 370/225
(58) Field of Classification Search
USPC ... 711/103, 162, E12.008, E12.103; 714/758, 714/E11.04; 370/225, 228
See application file for complete search history.

(56) References Cited

U.S. PATENT DOCUMENTS

| | | | | |
|---|---|---|---|---|
| 6,145,028 A | * | 11/2000 | Shank et al. | 710/31 |
| 7,143,250 B1 | * | 11/2006 | Riedl | 711/162 |
| 7,710,866 B2 | * | 5/2010 | Soetemans et al. | 370/225 |
| 2003/0093638 A1 | * | 5/2003 | Margerie et al. | 711/162 |
| 2004/0095967 A1 | * | 5/2004 | Sharma | 370/537 |

FOREIGN PATENT DOCUMENTS

| | | |
|---|---|---|
| CN | 1264092 C | 7/2006 |
| CN | 1942862 A | 4/2007 |

OTHER PUBLICATIONS

Office Action issued in corresponding Chinese Patent Application No. 2008100970248, mailed Aug. 28, 2009.

* cited by examiner

*Primary Examiner* — J. H. Hur
(74) *Attorney, Agent, or Firm* — Brinks Hofer Gilson & Lione

(57) ABSTRACT

A method for backing up data of a storage system, where at least two mirroring channels are provided between a first mainboard and a second mainboard of a storage system, and the method includes: transmitting data through at least one effective mirroring channel if all the mirroring channels are effective; and transmitting the data through remaining mirroring channel(s) if at least one of the mirroring channels for transmitting the data fails. The method enables traffic to be transmitted evenly on normal mirroring channels, and ensures maximized utilization of the bandwidth of mirroring channels.

19 Claims, 10 Drawing Sheets

METHOD AND APPARATUS FOR BACKING UP STORAGE SYSTEM DATA

CROSS-REFERENCE TO RELATED APPLICATIONS

This application claims a priority from the Chinese Patent Application No. 200810097024.8, filed with the Chinese Patent Office on May 8, 2008 and entitled "METHOD AND APPARATUS FOR BACKING UP STORAGE SYSTEM DATA", the contents of which are incorporated herein by reference in their entirety.

FIELD OF THE INVENTION

The present disclosure relates to the field of communication technologies, and in particular, to a method and apparatus for backing up data of a storage system.

BACKGROUND

A specific storage system is functionally divided into a controlling head and a disk array, which are physically combined into one. Generally, the controlling head of a low-end storage system requires a low reliability, and includes only one control board, i.e. one controller. A mid-end or high-end storage system requires a high reliability, and requires at least "1+1" backup for the input power supply of the storage system, power module of the storage system, battery, and the channel between the switch and the disk array. Moreover, the mid-end system includes two controllers, and the controlling head of the high-end system includes more than two controllers, and the data thereof also needs to be backed up.

FIG. 1 shows the application scenario of a storage device. The data written by a server into a disk array needs to be processed by a controlling head. The data is temporarily stored in the memory of the controlling head, and is sent to the disk array after being processed. Such data needs to be backed up by the system, and such a process is called "writing a memory".

A common solution is to: use an area in the memory of other controlling head as a mirroring area of the controlling head, and use the hardware mirroring channel between controlling heads to synchronize the written memory of the controlling head with the mirroring memory of other controlling heads, in order to ensure that the data is consistent between them anytime. A mirroring channel refers to a data transmission channel created by a physical connection. As its name implies, the mirroring channel implements "replication" of storage data between two controlling heads. As shown in FIG. 2, a mainboard A is the controlling head in FIG. 1, a mainboard B is a controlling head for backing up data. A mirroring channel is created between the mainboard A and the mainboard B through a physical connection. Under control of a CPU group, the data of the mainboard A is written into the memory group of the mainboard B through the mirroring channel. The mainboard A communicates with the mainboard B through a north bridge as a communication interface. Mirroring channels require a specific bandwidth for fulfilling the real time and data traffic requirements.

When a mirroring channel fails, the backup relation does not exist any longer. Therefore, an inter-board control channel is generally used as a backup channel of the mirroring channel. An inter-board control channel is designed to transfer the control information between mainboards. When the mirroring channel fails, the inter-board channel may work to implement the controller mirroring function.

In the research process of the present disclosure, the inventor finds out that the inter-board control channel is restricted by the function of its main transmission control information, and the maximum quantity of data traffic allowed is too small to fulfill the data backup function. Therefore, when an inter-board control channel replaces a mirroring channel, the bandwidth of data traffic is decreased massively, and the system performance is deteriorated.

SUMMARY

Embodiments of the present disclosure provides a method and an apparatus for backing up storage system data in order to improve the traffic bandwidth.

A method for backing up data of a storage system provided in an embodiment of the present disclosure, where at least two mirroring channels are provided between a first mainboard and a second mainboard of a storage system, and the method may include:
  transmitting data through at least one effective mirroring channel if all the mirroring channels are effective; and
  transmitting the data through remaining effective mirroring channel(s) if at least one of the mirroring channels for transmitting the data fails;
  the method further comprising;
  performing interconnection control for the multiple mirroring channels for transmitting the data;
  the process of interconnection control for the multiple mirroring channels may include the following step:
  segmenting the data according to addresses; and
  transmitting the data of different segments through the respective effective mirroring channel;
  the data segments are updated and controlled in real time according to the change of the data quantity and the fault of the mirroring channel.

An apparatus for backing up data of a storage system provided in another embodiment of the present disclosure, may include:
  a multi-channel setting unit, adapted to set at least two mirroring channels between a first mainboard and a second mainboard of a storage system;
  a fault judging unit, adapted to judge whether mirroring channel(s) for transmitting data is effective; and
  a traffic balance controlling unit, adapted to control effective mirroring channel(s) to transmit the data according to the judging result of the fault judging unit
  further comprising:
  an interconnection control unit, adapted to perform interconnection control over the mirroring channels for transmitting the data, specifically adapted to perform the following step: segmenting the data according to addresses; and transmitting the data of different segments through the respective effective mirroring channel; the data segments are updated and controlled in real time according to the change of the data quantity and the fault of the mirroring channel.

An apparatus for backing up data of a storage system provided in another embodiment of the present disclosure, may include:
  a multi-channel setting unit, adapted to set at least two mirroring channels between a first mainboard and a second mainboard of a storage system;
  an active-standby setting unit, adapted to set at least one mirroring channel of the at least two mirroring channels as active mirroring channel, and set the remaining mirroring channel of the remaining mirroring channels as standby mirroring channel;

a fault judging unit, adapted to judge whether the active mirroring channel for transmitting data is effective; and an active-standby control unit, adapted to active at least one active mirroring channel to transmit the data if the least one active mirroring channel is effective, and active the standby mirroring channel to participate in transmitting the data if at least one active mirroring channel for transmitting the data fails.

A computer program product provided in another embodiment of the present disclosure, comprising computer program code, which, when executed by a computer unit, will cause the computer unit to perform the steps of the method.

Therefore, multiple mirroring channels are set between two mainboards in an embodiment of the present disclosure. When one or more of the mirroring channels fail, the data may be transmitted through the remaining normal mirroring channels. Thus the real time and traffic bandwidth requirements may be implemented during the data backup.

DETAILED DESCRIPTION

Figure 1:
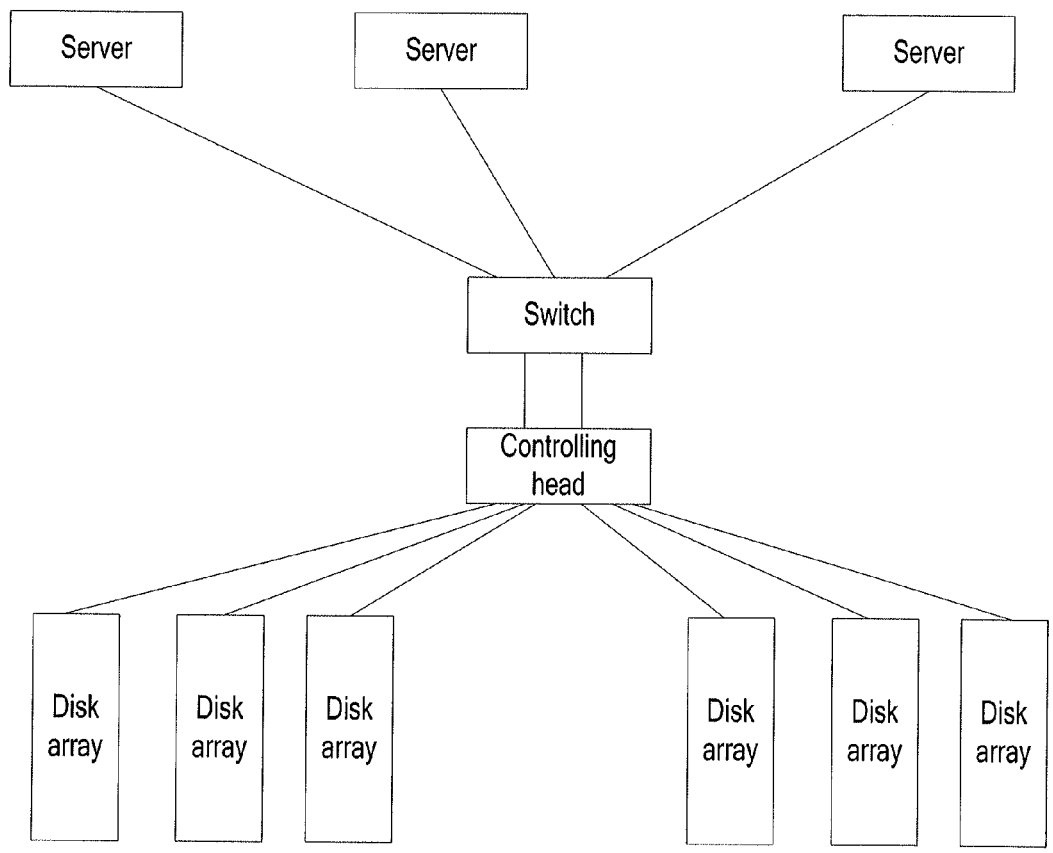
FIG. 1 shows the application scenario of a storage device in prior art.
Figure 2:
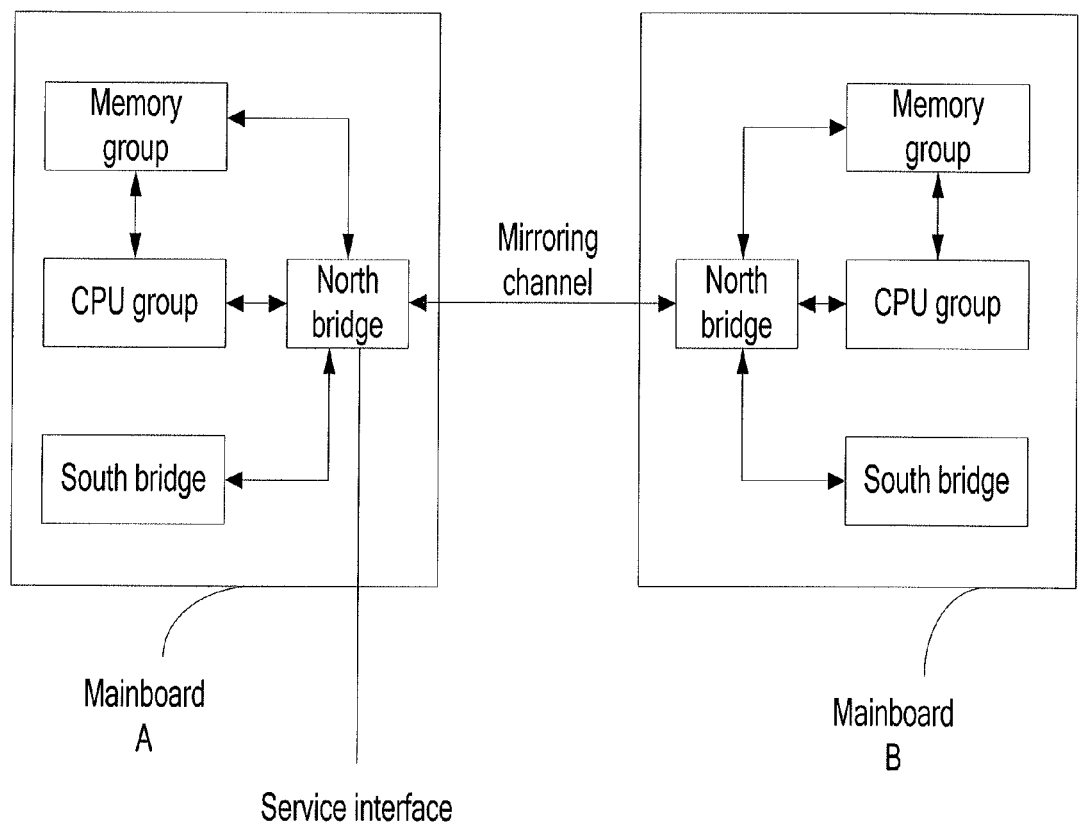
FIG. 2 shows the application of a mirroring channel of a storage device in prior art.
Figure 3:
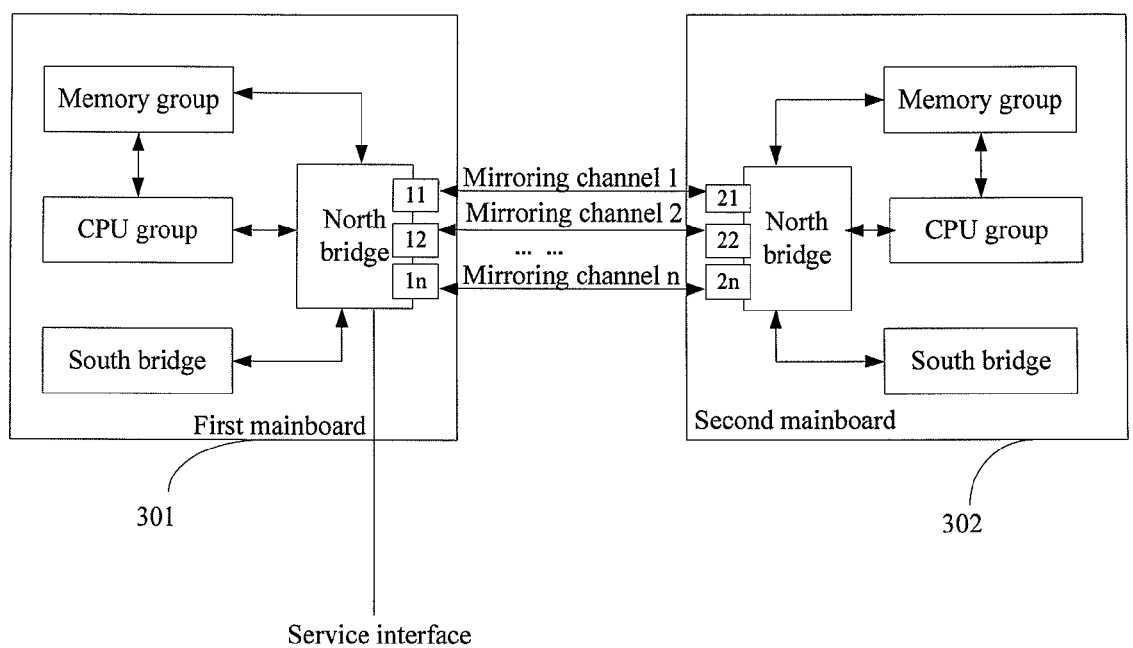
FIG. 3 shows the backup of multiple mirroring channels of a storage device according to an embodiment of the present disclosure.

As shown in FIG. 3, a storage system in an embodiment of the present disclosure may include multiple mirroring channels, for example, at least two mirroring channels. The storage system may include a first mainboard 301 and a second mainboard 302. Two or more mirroring channels are provided between the first mainboard 301 and the second mainboard 302, including mirroring channels 1, 2 . . . n. The specific configuration mode of each mirroring channel may be described in the following. The mirroring channel is formed through a physical connection between the interface of the first mainboard 301 and the interface of the second mainboard 302. For example, the mirroring channel 1 is formed through a physical connection between an interface 11 of the first mainboard 301 and an interface 21 of the second mainboard 302; the mirroring channel 2 is formed through a physical connection between an interface 12 of the first mainboard 301 and an interface 22 of the second mainboard 302; . . . ; the mirroring channel n is formed through a physical connection between an interface n1 of the first mainboard 301 and an interface n2 of the second mainboard 302.

For traffic control of multiple mirroring channels, an equalization channel configuration mode may be adopted. The equalization channel configuration mode is used to ensure equalization of data traffic among all mirroring channels by using a traffic equalization algorithm, thus avoiding, data congestion because the massive difference of traffic may make the data traffic of a certain channel exceed the channel bandwidth limit and lead to deteriorated performance. In this configuration mode, it is sure that the bandwidth utilization of the mirroring channel is improved, e.g. maximized.

Suppose that there are n mirroring channels between boards, and the bandwidth of each channel is x GB/s. When the storage system works normally, the storage system may use all mirroring channels as memory mirroring, and the whole channel bandwidth is xn GB/s. When an inter-board mirroring channel fails, the storage system uses the remaining effective mirroring channels to perform inter-board mirroring through a traffic control equalization mechanism. The bandwidth of the channels is $x(n-1)$ GB/s, which is only x GB/s less than normal. In this way, the mirroring channel is backed up at a low cost of bandwidth, and single-point faults are avoided.

For example, a method for backing up data of a storage system is provided according to an embodiment of the present disclosure, at least two mirroring channels are provided between a first mainboard and a second mainboard of a storage system. The method comprises: transmitting data through effective mirroring channel, e.g. at least one effective mirroring channel, if all mirroring channels are effective; and transmitting the data through remaining normal mirroring channel, e.g. at least one remaining effective mirroring channel, if at least one mirroring channel for transmitting the data fails.

Figure 4:
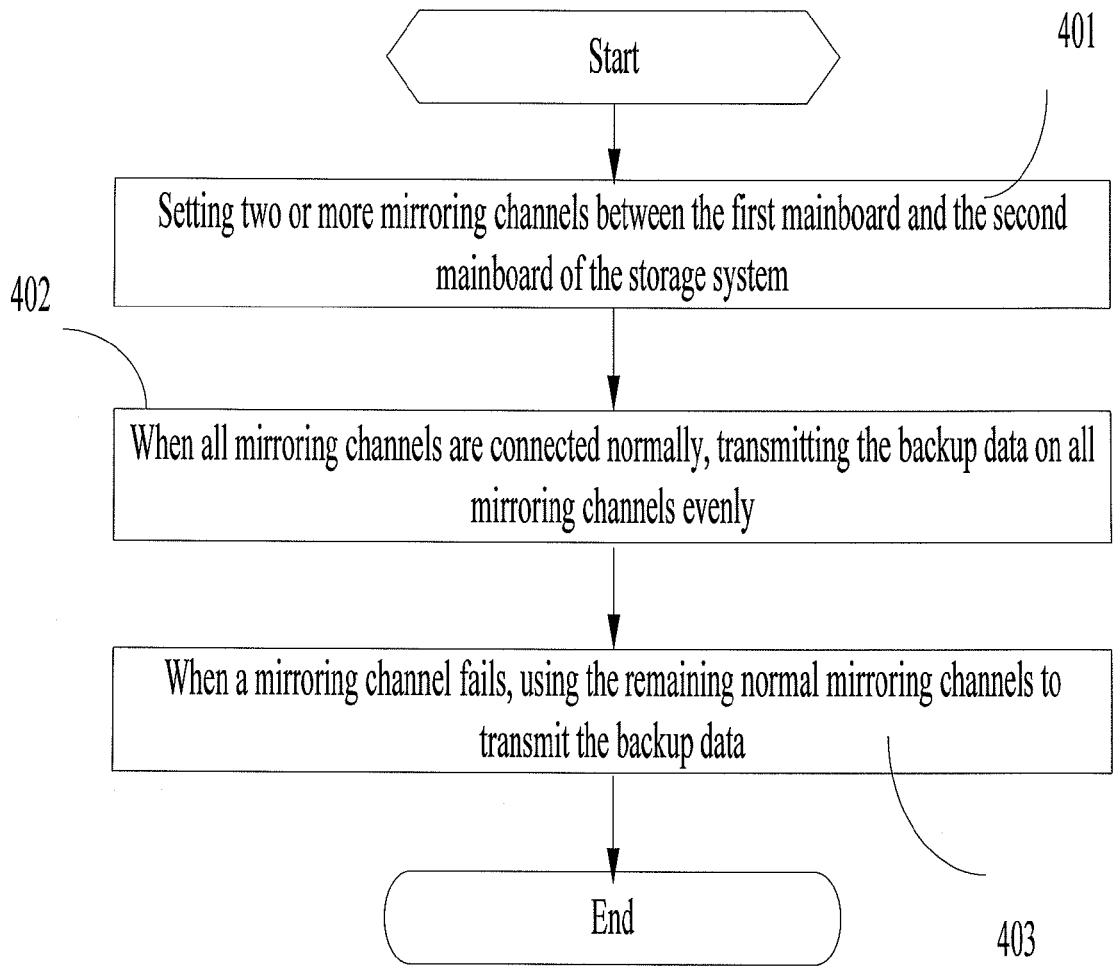
FIG. 4 is a flowchart of the data backup method of a storage system according to another embodiment of the present disclosure.

FIG. 4 is a flowchart of the data backup method of a storage system according to another embodiment of the present disclosure. The method may include the following steps.

S401: Two or more mirroring channels may be set between a first mainboard and a second mainboard of the storage system.

S402: When all mirroring channels are connected normally, backup data may be transmitted on all mirroring channels evenly.

S403: When at least one mirroring channel fails, the remaining normal mirroring channels may be used to transmit the backup data.

Taking FIG. 3 as an example, when n mirroring channels are connected normally, the traffic may be transmitted evenly through the n mirroring channels; when one or more of the mirroring channels fail, the remaining normal mirroring channel may be used to transmit the traffic evenly. In this configuration mode, it is sure that the bandwidth utilization of the mirroring channel is improved, e.g. maximized.

Preferably, another embodiment also includes a process for performing mutual exclusive access control for all mirroring channels.

Figure 5:
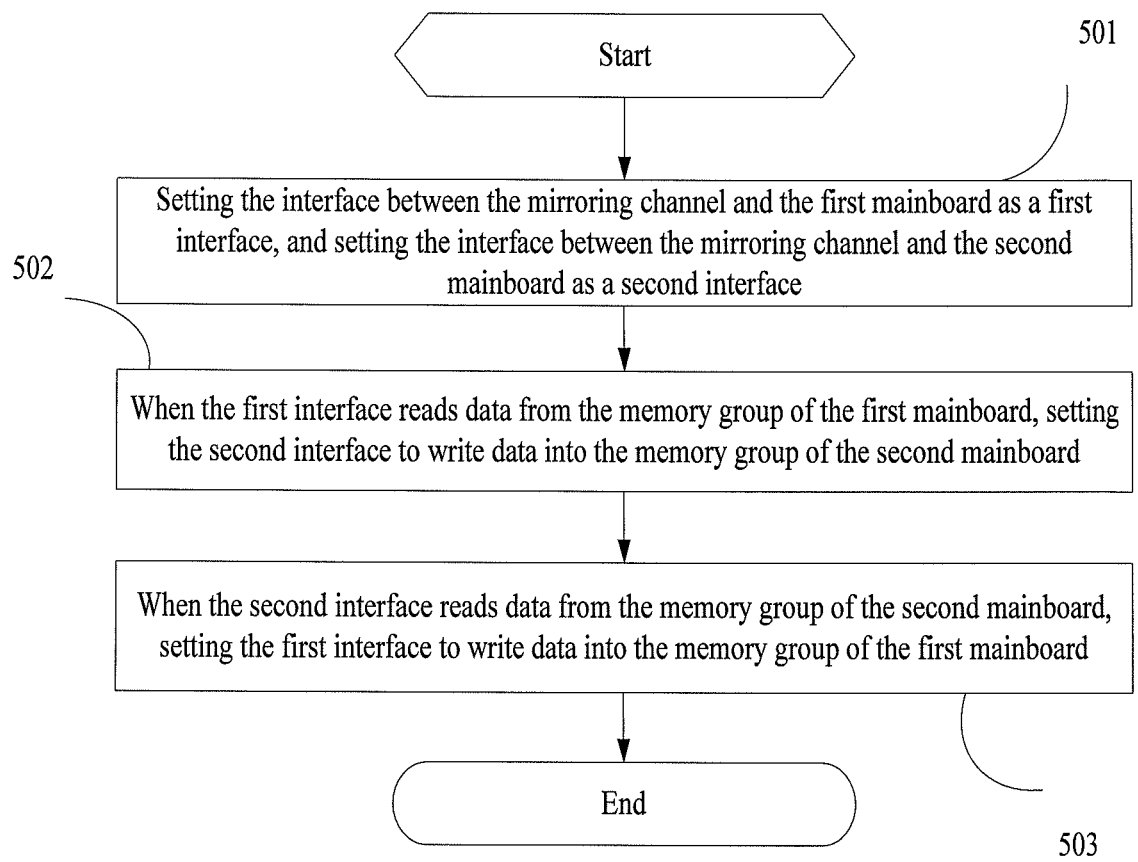
FIG. 5 is a flowchart of the mutual exclusive access control in the data backup method of a storage system according to another embodiment of the present disclosure.

As shown in FIG. 5, a process of mutual exclusive access control for all mirroring channels is provided according to another embodiment of the present disclosure, and the process may include the following steps.

S501: An interface between a mirroring channel and the first mainboard may be set as a first interface, and another interface between another mirroring channel and the second mainboard may be set as a second interface.

S502: When the first interface reads data from a memory group of the first mainboard, the second interface may write data into a memory group of the second mainboard.

Alternatively, the process may further include the following steps.

S503: When the second interface reads data from the memory group of the second mainboard, the first interface may write data into the memory group of the first mainboard.

According another embodiment, mutual exclusive access control management is provided for the mirroring channels. Taking FIG. 3 as an example, for the mirroring channel 1, when the first mainboard interface 11 reads data from the memory group of the first mainboard, the second mainboard interface 21 may write data into the memory group of the second mainboard. It is the same with the remaining mirroring channels.

Figure 6:
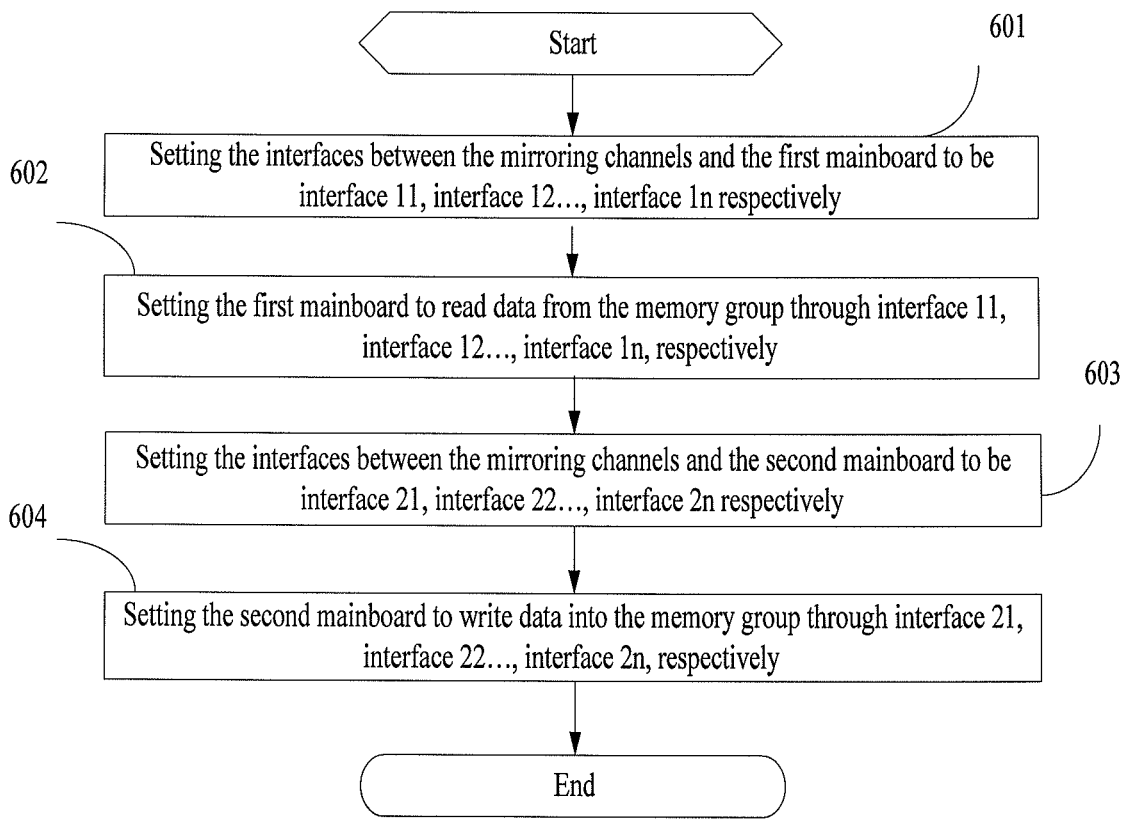
FIG. 6 is a flowchart illustrating multiple-interface mutual exclusive access control in the data backup method of a storage system according to another embodiment of the present disclosure.

Coordinated management should also be performed for multiple mirroring channels connected with each mainboard. Multiple-interface mutual exclusive access management should be performed for multiple mirroring channels, namely, the data transmission direction of multiple interfaces is controlled uniformly. That is to say, all interfaces between the first mainboard (or the second mainboard) and all mirroring channels are controlled to read data from a memory group uniformly or write data into a memory group uniformly. As shown in FIG. 6, the process may include the following step.

S601: The interfaces between the mirroring channels and the first mainboard may include an interface 11, an interface 12 . . . , an interface 1$n$ respectively.

S602: The first mainboard may read data from a memory group of the first mainboard through the interface 11, interface 12 . . . , interface 1$n$, respectively.

Likewise, S603: The interfaces between the mirroring channels and the second mainboard may include an interface 21, an interface 22 . . . , an interface 2$n$ respectively.

S604: The second mainboard may write data into a memory group of the second mainboard through the interface 21, interface 22 . . . , interface 2$n$, respectively.

According to another embodiment, mutual exclusive access control management is provided for the multiple mirroring channels. Taking FIG. 3 as an example, for the first mainboard 301, when data is read from the memory group of the first mainboard 301 through the interface 11, it is necessary that the data needs to be read from the memory group of the first mainboard 301 through the interface 12, . . . , interface 1$n$. According another embodiment, the data may be written into the memory group of the first mainboard 301 through the interface 11, interface 12, . . . , interface 1$n$. It is the same with the second mainboard 302.

Preferably, the above-described embodiment may further include a process of interconnection control for the multiple mirroring channels.

Figure 7:
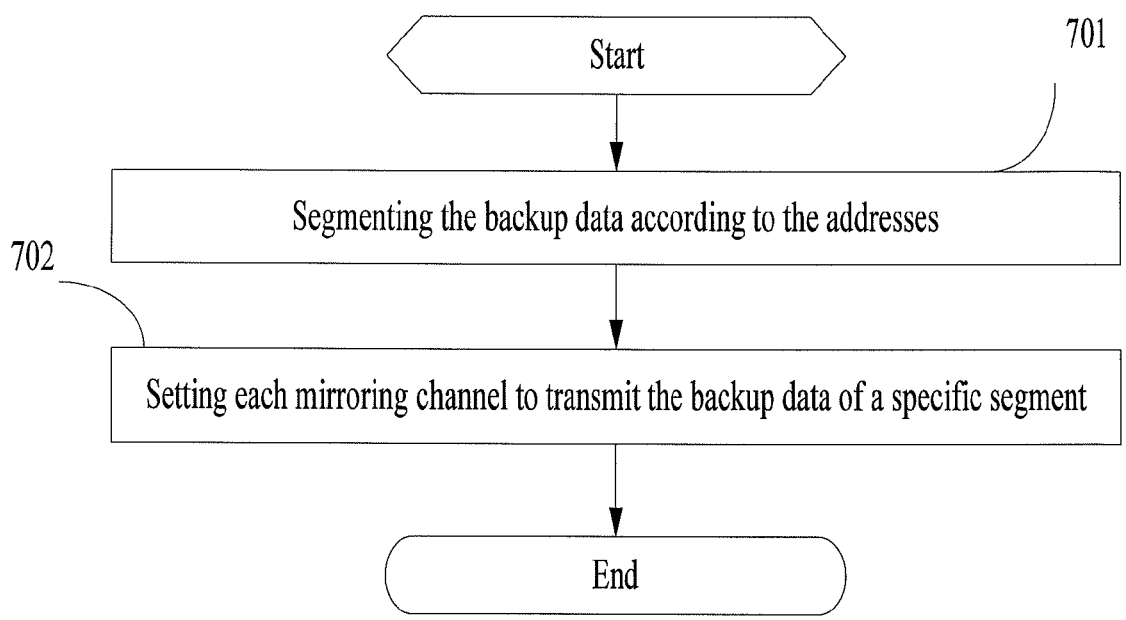
FIG. 7 is a flowchart of the interconnection control in the data backup method of a storage system according to another embodiment of the present disclosure.

As shown in FIG. 7, the process of interconnection control for the multiple mirroring channels in the above-described embodiment of the method may include the following step.

S701: The backup data may be segmented according to addresses.

S702: Different mirroring channels are used to transmit the backup data of the different segments respectively.

According another embodiment, it is provides interconnection control for the multiple mirroring channels. Taking FIG. 3 as an example, for the first mainboard 301, the data of the memory group of the first mainboard 301 may be segmented according to addresses. More particularly, the data of the memory group of the first mainboard 301 may be divided segments corresponding to the mirroring channels: data_1, data_2, . . . , data_n, and the data_1 may be transmitted through the mirroring channel 1, the data_2 may be transmitted through the mirroring channel 2, . . . , and the data_n may be transmitted through the mirroring channel n. Moreover, the data segments are updated and controlled in real time according to the change of the data quantity and the fault of the mirroring channel.

It should be noted that, the mutual exclusive management, multiple-interface mutual exclusive management, and interconnection control for the multiple channels illustrated in FIGS. 5, 6 and 7 and the foregoing texts refer to management for normal mirroring channels. Still taking FIG. 3 as an example, if the n mirroring channels in the system are normal, the foregoing three types of management may be performed for the n mirroring channels; if i ($1 \leq i < n$) mirroring channel (s) is fails, the foregoing three types of management may be performed for the remaining normal n−i mirroring channels.

Described below is a data backup method of a storage system according to another embodiment of the present disclosure.

For traffic control of multiple mirroring channels, an active-standby channel mode may be adopted. The active-standby channel mode means that some mirroring channels are set as active channels and the remaining channels are set as standby channels. By default, the active channels are used as inter-board memory mirroring working channels, and the Error Checking and Correcting (ECC) of data streams or receiving flag of the physical connection is used as an identifier which indicates whether the channel fails. When at least one active channel fails, at least one standby channel may change over to be active channel, or at least one standby channel change may be activated to participate in transmitting the data.

According to another embodiment of the present disclosure, a method for backing up data of a storage system is provided; at least one active mirroring channel and at least one standby mirroring channel are provided between a first mainboard and a second mainboard of a storage system. The method includes: transmitting data through at least one active effective mirroring channel when the at least one active effective mirroring channel is effective; and activating at least one standby effective mirroring channel to participate in transmitting the data if at least one active mirroring channel for transmitting the data fails.

Figure 8:
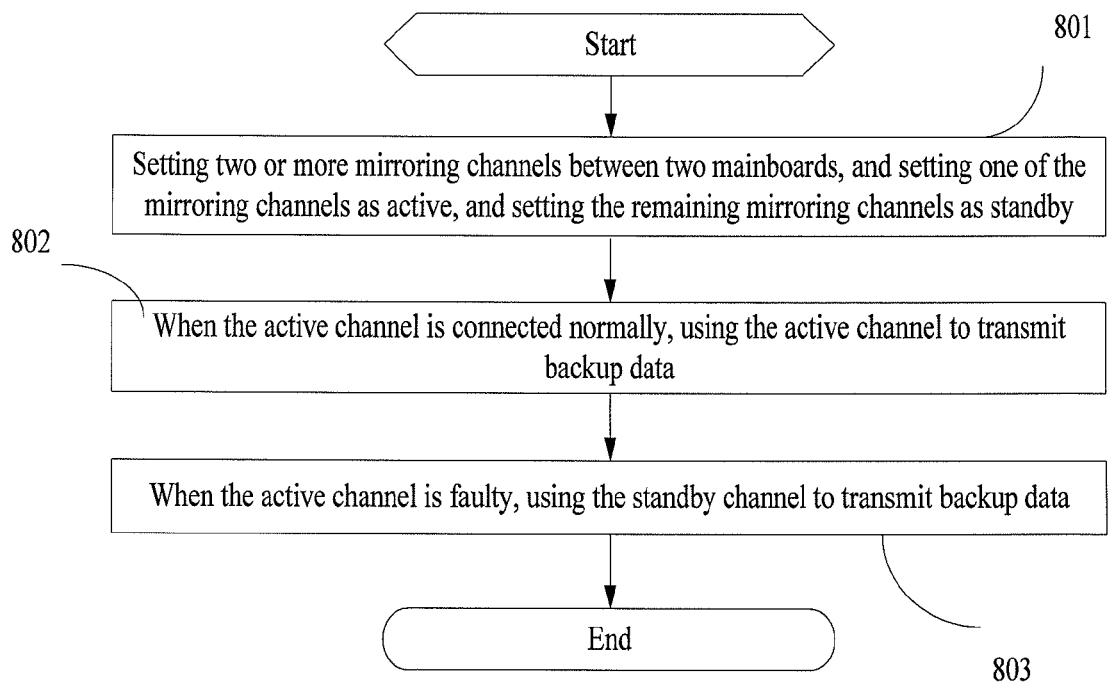
FIG. 8 is a flowchart of the data backup method of a storage system according to another embodiment of the present disclosure.

As shown in FIG. 8, the process of the method according to another embodiment of the present disclosure may include the following step.

S801: Two or more mirroring channels are provided between two mainboards, and one of the mirroring channels may be set as active channel, or at least one of the mirroring channels may be set as active channel, and the remaining mirroring channels may be set as standby channel.

S802: When the active channel is connected normally, for example, at least one active channel for transmitting data is connected normally, backup data may be transmitted through at least one of the normal active channel.

S803: When the active channel fails, the standby channel is used to transmit backup data For example, if at least one active channel for transmitting the backup data fails, at least one standby channel may be activated to participate in transmitting the backup data.

Taking FIG. 3 as an example, by default, a mirroring channel 1 is an active channel. When the mirroring channel 1 is connected normally, the backup data are transmitted through the mirroring channel 1 which is an active channel; when the active channel fails, a normal standby channel, for example, mirroring channel 2, is used to transmit the backup data.

In the above-mentioned embodiment, the data traffic may be transmitted through one mirroring channel, the implementation and the control are simple, and the mutual exclusive management needs to be performed for the currently mirroring channel for transmitting the data. The specific management process is illustrated in FIG. 5, and is not repeated here any further.

According to another embodiment, the data traffic may be transmitted through at least two mirroring channels, the mutual exclusive management, multiple-interface mutual exclusive management, and interconnection control for the multiple channels illustrated in FIGS. 5, 6 and 7 needs to be performed. For example, the mirroring channels 1, 2, 3 are active channel, the mirroring channels 4, 5, 6 are standby channel. When the mirroring channels 1, 2, 3 are connected normally, the backup data are transmitted through the mirroring channels 1, 2, 3 which are active channel; when the active channel 1 fails, a normal standby channel, for example, the mirroring channel 4, may be activated to participate in transmitting the backup data, then the backup data may be transmitted through the mirroring channels 2, 3, 4.

Corresponding to the method described above, an apparatus for backing up data of a storage system is disclosed. The apparatus may be a function entity that exists in a memory of a storage system, or may be implemented through hardware, software, or combination thereof.

Figure 9:
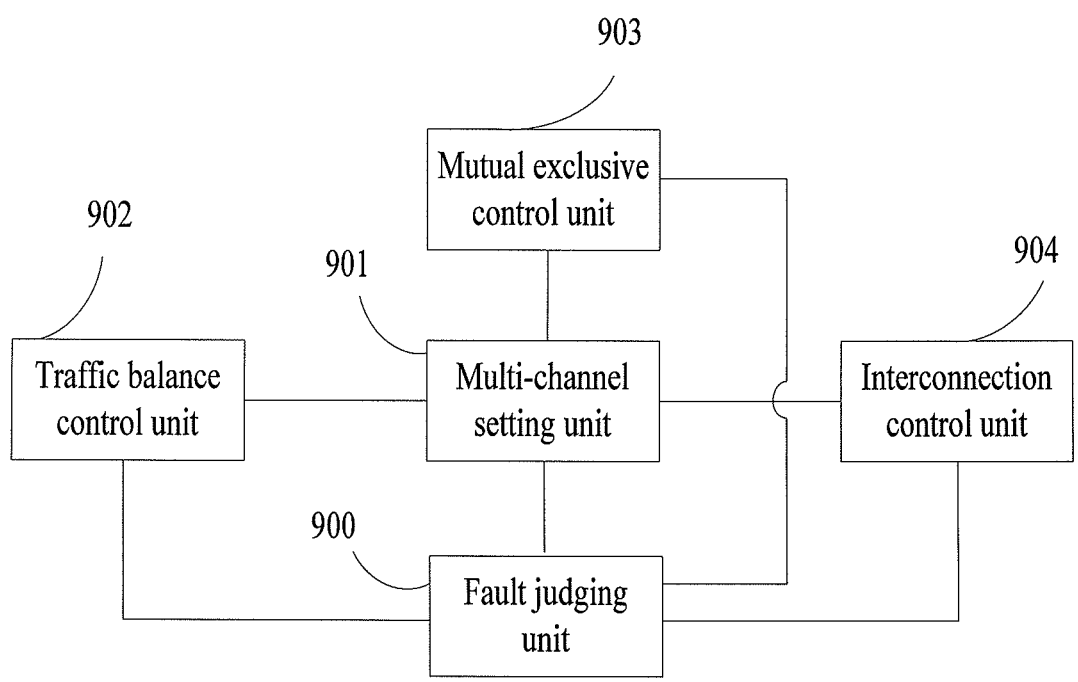
FIG. 9 shows the structure of a data backup apparatus of a storage system according to another embodiment of the present disclosure.

As shown in FIG. 9, the apparatus is provided according to another embodiment at least includes a fault judging unit 900, a multi-channel setting unit 901, a traffic balance control unit 902, and preferably includes a multi-interface mutual exclusive control unit 903 and a mutual exclusive control unit 904, as detailed below.

The multi-channel setting unit 901 may be adapted to set two or more mirroring channels between a first mainboard and a second mainboard of a storage system.

The fault judging unit 900 may be adapted to judge whether the mirroring channels set by the multi-channel setting unit 901 contain any faulty channel, for example, the fault judging unit 900 may be adapted to judge whether mirroring channel(s) for transmitting data is effective.

The traffic balance control unit 902 may be adapted to control effective mirroring channel(s) to transmit the data. For example, the traffic balance control unit 902 may be adapted to control the backup data to be transmitted evenly on all the normally connected mirroring channels except the faulty channel.

The multi-interface mutual exclusive control unit 903 may be adapted to perform multiple-interface mutual exclusive access control over the effective mirroring channels; for example, the multi-interface mutual exclusive control unit 903 may be adapted to perform multiple-interface mutual exclusive access control for multiple mirroring channels which are connected normally.

The interconnection control unit 904 may be adapted to perform interconnection control for multiple mirroring channels which are connected normally. For example, the interconnection control unit 904 may be adapted to perform interconnection control over the mirroring channels for transmitting the data Suppose that in the apparatus of the embodiment, n inter-board mirroring channels are set by the multi-channel setting unit 901, and the bandwidth of each channel is x GB/s. When the fault judging unit 900 judges that all the mirroring channel are connected normally, the traffic balance control unit 902 uses all mirroring channels as memory mirroring, and the total bandwidth of the channels is xn GB/s. When the fault judging unit 900 judges that one inter-board mirroring channel fails, the traffic balance control unit 902 uses the remaining effective mirroring channels to perform inter-board mirroring through a traffic control equalization mechanism. The bandwidth of the channels is x(n−1) GB/s, which is only x GB/s less than normal. In this way, the mirroring channel is backed up at a low cost of bandwidth, and single-point faults are avoided.

According another embodiment of the present disclosure, when the fault judging unit 900 judges that at least one inter-board mirroring channel which transmits the data fails, the traffic balance control unit 902 may activate at least one of the remaining effective mirroring channels to participate in transmitting the data.

For the working process of the units of the apparatus in the embodiment, refer to the method in the embodiment.

Figure 10:
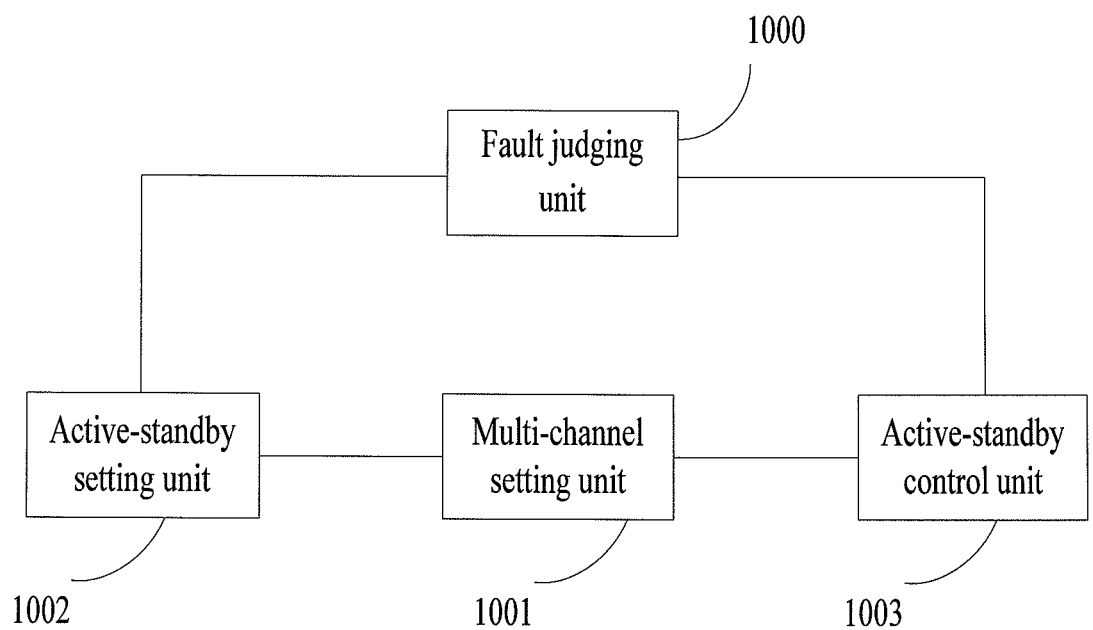
FIG. 10 shows the structure of a data backup apparatus of a storage system according to another embodiment of the present disclosure.

As shown in FIG. 10, the apparatus in another embodiment includes: a multi-channel setting unit 1001, an active-standby setting unit 1002, a fault judging unit 1000, and an active-standby control unit 1003, as detailed below.

The multi-channel setting unit 1001 may be adapted to set two or more mirroring channels between a first mainboard and a second mainboard of a storage system. For example, the multi-channel setting unit 1001 may be adapted to set at least two mirroring channels between the first mainboard and the second mainboard of the storage system.

The active-standby setting unit 1002 may be adapted to set one of multiple mirroring channels as active, and set the remaining mirroring channels as standby, for example, the active-standby setting unit 1002 may be adapted to set at least one mirroring channel of the at least two mirroring channels as active mirroring channel, and set the remaining mirroring channel of the remaining mirroring channels as standby mirroring channel.

The fault judging unit 1000 may be adapted to judge whether the active channel is connected normally or fails, for example, the fault judging unit 1000 may be adapted to judge whether the active mirroring channel for transmitting data is effective.

The active-standby control unit 1003 may be adapted to use the active channel to transmit backup data when the active channel is normally connected and use the standby channel to transmit the backup data if the active channel fails. For example, the active-standby control unit 1003 may be adapted to active at least one active mirroring channel to transmit the data if the least one active mirroring channel is effective, and active the standby mirroring channel to participate in transmitting the data if at least one active mirroring channel for transmitting the data fails.

By default, in another embodiment of the apparatus, the active channels may be used as inter-board memory mirroring working channels, and the Error Checking and Correcting (ECC) of data streams or receiving flag of the physical connection may be used as an identifier which indicates whether the channel fails. When the active channel fails, the standby channel changes over to be active.

For the working process of the units of the apparatus in the embodiment, refer to the method in the embodiment.

Therefore, multiple mirroring channels are set between two mainboards in an embodiment of the present disclosure. When all mirroring channels are connected normally, the traffic is transmitted evenly through all mirroring channels. If one or more of the mirroring channels fail, the traffic is transmitted evenly through the remaining normal mirroring channels. If one of the mirroring channels fails, the traffic is transmitted through other normal mirroring channels, thus fulfilling the real time and traffic bandwidth requirements during the data backup.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in magnetic disk, compact disk, Read-Only Memory, ROM; Programmable Read-Only Memory, PROM; Erasable PROM, EPROM; Flash memory; Electrically Erasable PROM, EEPROM; and hard disk drive or any other form of storage medium known in the art. A storage medium may be coupled to the processor such that the processor can read information from, and write information to, the storage medium. In the alternative, the storage medium may be integral to the processor.

Although the disclosure has been described through preferred exemplary embodiments, the disclosure is not limited to such embodiments. It is apparent that those skilled in the art can make various modifications and variations to the disclosure without departing from the spirit and scope of the disclosure.

What is claimed is:

1. A method for backing up a storage system, wherein the storage system comprises at least two mirroring channels for transmitting data between a first mainboard and a second mainboard of the storage system, the method comprising:
   determining whether at least one of the at least two mirroring channels fails;
   if the at least one of the at least two mirroring channels does not fail, segmenting data to be transmitted into a first number of segments of data according to location addresses of the data to be transmitted and a number of the at least two mirroring channels, wherein the first number equals to the number of the at least two mirroring channels, and the first number of segments are assigned to the at least two mirroring channels respectively;
   transmitting each of the first number of segments through the assigned mirroring channel;
   if the at least one of the at least two mirroring channels fails, segmenting the data to be transmitted into a second number of segments of data according to the location addresses and a number of active mirroring channels in the at least two mirroring channels, wherein the second number equals to the number of the active mirroring channels, and the second number of segments are assigned to the active mirroring channels respectively;
   transmitting each of the second number of segments through the assigned active mirroring channel.

2. The method according to claim 1, wherein the first number of segments are assigned to the at least two mirroring channels in a channel equalization mode.

3. The method according to claim 1, wherein the first number of segments are assigned to the at least two mirroring channels in a channel equalization mode.

4. The method according to claim 1, wherein when a first set of data is read from a memory group of the first mainboard through the at least two mirroring channels or the active mirroring channels, a second set of data is wrote into a memory group of the second mainboard through the at least two mirroring channels or the active mirroring channels.

5. The method according to claim 1, wherein when a first set of data is read from a memory group of the first mainboard through a first interface, a second set of data is wrote into a memory group of the second mainboard through a second interface; wherein the first interface is an interface between a first mirroring channel and the first mainboard, and the second interface is an interface between the first mirroring channel and the second mainboard, and wherein the first mirroring channel is a channel of the at least two mirroring channels or the active mirroring channels.

6. The method according to claim 1, wherein the second number of segments are assigned to the active mirroring channels in a channel equalization mode.

7. An apparatus for backing up data of a storage system, wherein the storage system comprises at least two mirroring channels for transmitting data between a first mainboard and a second mainboard of the storage system, and the apparatus comprises:
   a processor, configured to determine whether at least one of the at least two mirroring channels fails; segment data to be transmitted into a first number of segments of data according to location addresses of the data to be transmitted and a number of the at least two mirroring channels, if the at least one of the at least two mirroring channels does not fail, wherein the first number equals to the number of the at least two mirroring channels, and the first number of segments are assigned to the at least two mirroring channels respectively; and segment the data to be transmitted into a second number of segments of data according to the location addresses and a number of active mirroring channels in the at least two mirroring channels, if the at least one of the at least two mirroring channels fails, wherein the second number equals to the number of the active mirroring channels, and the second number of segments are assigned to the active mirroring channels respectively; and
   transmission interfaces, configured to transmit each of the first number of segments through the assigned mirroring channel if the at least one of the at least two mirroring channels does not fail; and transmit each of the second number of segments through the assigned active mirroring channel if the at least one of the at least two mirroring channels fails.

8. The apparatus according to claim 7, wherein the first number of segments are assigned to the at least two mirroring channels in a channel equalization mode.

9. The apparatus according to claim 7, wherein the first number of segments are assigned to the at least two mirroring channels in a channel equalization mode.

10. The apparatus according to claim 7, wherein the at least two mirroring channels or the active mirroring channels are under mutually exclusive access control.

11. The apparatus according to claim 7, wherein when a first set of data is read from a memory group of the first mainboard through the at least two mirroring channels or the active mirroring channels, a second set of data is wrote into a memory group of the second mainboard through the at least two mirroring channels or the active mirroring channels.

12. The apparatus according to claim 7, wherein when a first set of data is read from a memory group of the first mainboard through a first interface, a second set of data is wrote into a memory group of the second mainboard through a second interface;
   wherein the first interface is an interface between a first mirroring channel and the first mainboard, and the second interface is an interface between the first mirroring channel and the second mainboard, and wherein the first mirroring channel is a channel of the at least two mirroring channels or the active mirroring channels.

13. The apparatus according to claim 7, wherein the second number of segments are assigned to the active mirroring channels in a channel equalization mode.

14. A computer program product, comprising computer program code stored on a computer readable medium which, when executed by a computer unit, will cause the computer unit to perform a method for backing up data of a storage system, wherein the storage system comprises at least two mirroring channels for transmitting data between a first mainboard and a second mainboard of the storage system, the method comprising the steps of:
- determining whether at least one of the at least two mirroring channels fails;
- if the at least one of the at least two mirroring channels does not fail, segmenting data to be transmitted into a first number of segments of data according to location addresses of the data to be transmitted and a number of the at least two mirroring channels, wherein the first number equals to the number of the at least two mirroring channels, and the first number of segments are assigned to the at least two mirroring channels respectively;
- transmitting each of the first number of segments through the assigned mirroring channel;
- if the at least one of the at least two mirroring channels fails, segmenting the data to be transmitted into a second number of segments of data according to the location addresses and a number of active mirroring channels in the at least two mirroring channels, wherein the second number equals to the number of the active mirroring channels, and the second number of segments are assigned to the active mirroring channels respectively;
- transmitting each of the second number of segments through the assigned active mirroring channel.

15. The computer program product of claim 14, wherein the computer readable medium comprises at least one medium selected from the group of: a magnetic disk, a compact disk, a Read-Only Memory (ROM) a Programmable Read-Only Memory (PROM); an Erasable PROM (EPROM); a Flash memory; an Electrically Erasable PROM (EEPROM); and a hard disk drive.

16. The computer program product according to claim 14, wherein the first number of segments are assigned to the at least two mirroring channels in a channel equalization mode.

17. The computer program product according to claim 14, wherein the at least two mirroring channels or the active mirroring channels are under mutually exclusive access control.

18. The computer program product according to claim 14, wherein when a first set of data is read from a memory group of the first mainboard through the at least two mirroring channels or the active mirroring channels, a second set of data is wrote into a memory group of the second mainboard through the at least two mirroring channels or the active mirroring channels.

19. The computer program product according to claim 14, wherein when a first set of data is read from a memory group of the first mainboard through a first interface, a second set of data is wrote into a memory group of the second mainboard through a second interface;
- wherein the first interface is an interface between a first mirroring channel and the first mainboard, and the second interface is an interface between the first mirroring channel and the second mainboard, and wherein the first mirroring channel is a channel of the at least two mirroring channels or the active mirroring channels.

* * * * *

UNITED STATES PATENT AND TRADEMARK OFFICE
CERTIFICATE OF CORRECTION

| | | |
|---|---|---|
| PATENT NO. | : 8,504,786 B2 | Page 1 of 1 |
| APPLICATION NO. | : 12/424280 | |
| DATED | : August 6, 2013 | |
| INVENTOR(S) | : Du et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this
Seventeenth Day of March, 2015

Michelle K. Lee
*Director of the United States Patent and Trademark Office*